United States Patent
Gould et al.

(10) Patent No.: US 6,572,361 B2
(45) Date of Patent: Jun. 3, 2003

(54) INJECTION MOLDING MACHINE HAVING A MIXER INSERT

(75) Inventors: Michael Gould, Essex Junction, VT (US); Thom Smith, Fairfax, VT (US); Abdeslam Bouti, Swanton, VT (US); Sheldon Alexander, Milton, VT (US); Milton Parsons, Essex Junction, VT (US)

(73) Assignee: Husky Injection Molding Systems, Ltd., Bolton (CA)

(*) Notice: Subject to any disclaimer, the term of this patent is extended or adjusted under 35 U.S.C. 154(b) by 78 days.

(21) Appl. No.: 09/845,399

(22) Filed: Apr. 30, 2001

(65) Prior Publication Data

US 2001/0026819 A1 Oct. 4, 2001

Related U.S. Application Data

(63) Continuation-in-part of application No. 09/605,763, filed on Jun. 28, 2000, now Pat. No. 6,382,528, which is a continuation-in-part of application No. 09/435,965, filed on Nov. 8, 1999, now Pat. No. 6,089,468.

(51) Int. Cl.[7] .............................................. B29C 45/22
(52) U.S. Cl. ..................... 425/572; 264/328.8; 425/588
(58) Field of Search .............................. 425/562, 563, 425/564, 565, 566, 572, 588; 264/328.8

(56) References Cited

U.S. PATENT DOCUMENTS

| 2,456,778 | A | * | 12/1948 | Gilchrist ...................... 425/563 |
| 3,156,013 | A | | 11/1964 | Elphie |
| 3,802,825 | A | | 4/1974 | Upmeier ...................... 425/378 |
| 3,911,073 | A | | 10/1975 | Charles-Massance ....... 264/171 |
| 3,934,626 | A | * | 1/1976 | Hall ........................... 425/563 |
| 4,541,982 | A | | 9/1985 | Upmeier ...................... 264/349 |
| 4,678,427 | A | * | 7/1987 | Fritzsche ..................... 425/562 |
| 4,681,528 | A | * | 7/1987 | Maruyama et al. .......... 425/562 |
| 5,405,258 | A | | 4/1995 | Babin .......................... 425/549 |
| 5,683,731 | A | | 11/1997 | Deardruff et al. ............ 425/572 |
| 5,688,462 | A | | 11/1997 | Salamon et al. ........ 264/328.14 |
| 5,996,618 | A | * | 12/1999 | Saito ........................... 425/563 |
| 6,089,468 | A | | 7/2000 | Bouti |

FOREIGN PATENT DOCUMENTS

| EP | 0293756 | 5/1988 |
| EP | 0 293 756 | 12/1988 |
| JP | 10 006363 | 1/1998 |

\* cited by examiner

*Primary Examiner*—Tim Heitbrink

(57) ABSTRACT

A method and apparatus for the installation of a mixer in a hot runner manifold is disclosed. An adapter plate is affixed to the manifold and directs the fluid flow through a mixer.

35 Claims, 5 Drawing Sheets

US 6,572,361 B2

INJECTION MOLDING MACHINE HAVING A MIXER INSERT

CROSS-REFERENCE TO RELATED APPLICATIONS

This a Continuation-In-Part of application Ser. No. 09/605,763 filed Jun. 28, 2000 now U.S. Pat. No. 6,382,528 which is a Continuation-In-Part of application Ser. No. 09/435,965 filed Nov. 8, 1999 now U.S. Pat. No. 6,089,468. Both of which are incorporated herein by reference.

BACKGROUND OF THE INVENTION

1. Field of the Invention

This invention relates to injection molding plastics. More specifically, this invention relates to an adapter apparatus and method for the insertion of a mixer in the melt stream of an injection molding machine.

2. Summary of the Prior Art

The large number of variables in the injection molding process creates serious challenges to creating a uniform and high quality part. These variables are significantly compounded within multi-cavity molds. Here we have the problem of not only shot to shot variations but also variations existing between individual cavities within a given shot.

Shear induced flow imbalances occur in all multi-cavity molds that use the industry standard multiple cavity "naturally balanced" runner system whereby the shear and thermal history within each mold is thought to be kept equal regardless of which hot-runner path is taken by the molten material as it flows to the mold cavities. These flow imbalances have been found to be significant and may be the largest contributor to product variation in multi-cavity molds.

Despite the geometrical balance, in what has traditionally been referred to as "naturally balanced" runner systems, it has been found that these runner systems can induce a significant variation in the melt conditions delivered to the various cavities within a multi-cavity mold. These variations can include melt temperature, pressure, and material properties. Within a multi-cavity mold, this will result in variations in the size, shape and mechanical properties of the product. Though the effect is most recognized in molds with eight or more cavities, it can create cavity to cavity variations in molds with as few as two cavities.

The flow imbalance in a mold with a geometrically balanced runner is created as a result of shear and thermal variations developed across the melt as it flows through the runner. The melt in the outer region (perimeter) of the runner's cross-section experiences different shear and temperature conditions than the melt in the center region. As flow is laminar during injection molding, the position of these variations across the melt stream is maintained along the length of the runner branch. When the runner branch is split, the center to perimeter variation becomes a side to side variation after the split. This side to side variation will result in variations in melt conditions from one side to the other of the part molded from the runner branch.

If the runner branches were to split even further, as in a mold with 4 or more cavities, there will exist a different melt in each of the runner branches. This will result in variations in the product created in each mold cavity. It is important to note that as consecutive turns and/or splits of the melt channel occur, the difference in melt temperature and shear history is further amplified. This cumulative effect is clearly recognized in large multi-cavity molds where the runner branches split and turn many times.

In an attempt to reduce this variation, the prior art has been primarily directed at various mixing devices that are located within the runner nozzle which is typically just prior the mold cavity. Examples of this can be found in U.S. Pat. No. 4,965,028 to Manus et al. and U.S. Pat. No. 5,405,258 to Babin.

Mixers at various locations within the injection molding machine are also well known. Examples of mixers in the hot runner manifold include U.S. Pat. No. 5,683,731 to Deardurff et al., European Patent 0293756, U.S. Pat. No. 5,688,462 to Salamon et al. and U.S. Pat. No. 4,848,920 to Heathe et al. (all incorporated herein by reference). An example of mixers installed within the injection unit can be found in U.S. Pat. No. 3,156,013 to Elphee (incorporated herein by reference).

Within the prior art, at least as much as known, there is no retrofit apparatus or method for installation of a mixer in an already existing injection molding machine, specifically in the hot runner manifold. Attempts at alleviating runner imbalance has been directed at correcting the problem within the injection nozzle or further upstream in the machine nozzle or sprue bar.

There exists a need for an adapter apparatus and method that allows for the retrofit of injection molding machines for the placement of a mixer in the melt stream. Preferably, the mixer should be installed just upstream of where the melt channel splits or divides.

SUMMARY OF THE INVENTION

In an injection molding machine for the creation of molded articles, the present invention provides a hot runner subsystem comprising a generally plate-like heated hot runner manifold, an adapter late rigidly affixed to the manifold, and a mixer. The manifold has at least one primary melt channel disposed therein for the communication of a fluid. The adapter plate ha at least one first melt channel in fluid communication with the at least one primary melt channel. The mixer has an inlet in fluid communication with said first melt channel, and an exit in fluid communication with a secondary melt channel. In various embodiments, the mixer may be retained in a bore located in the adapter plate, the manifold, or both the manifold and adapter plate. The secondary melt channel is preferably in the manifold. In an embodiment of the invention, the manifold has an elongated plug for altering the path of the primary melt channel for communication of the fluid to the adapter plate and to the mixer.

DETAILED DESCRIPTION OF THE PREFERRED EMBODIMENTS

Figure 1:
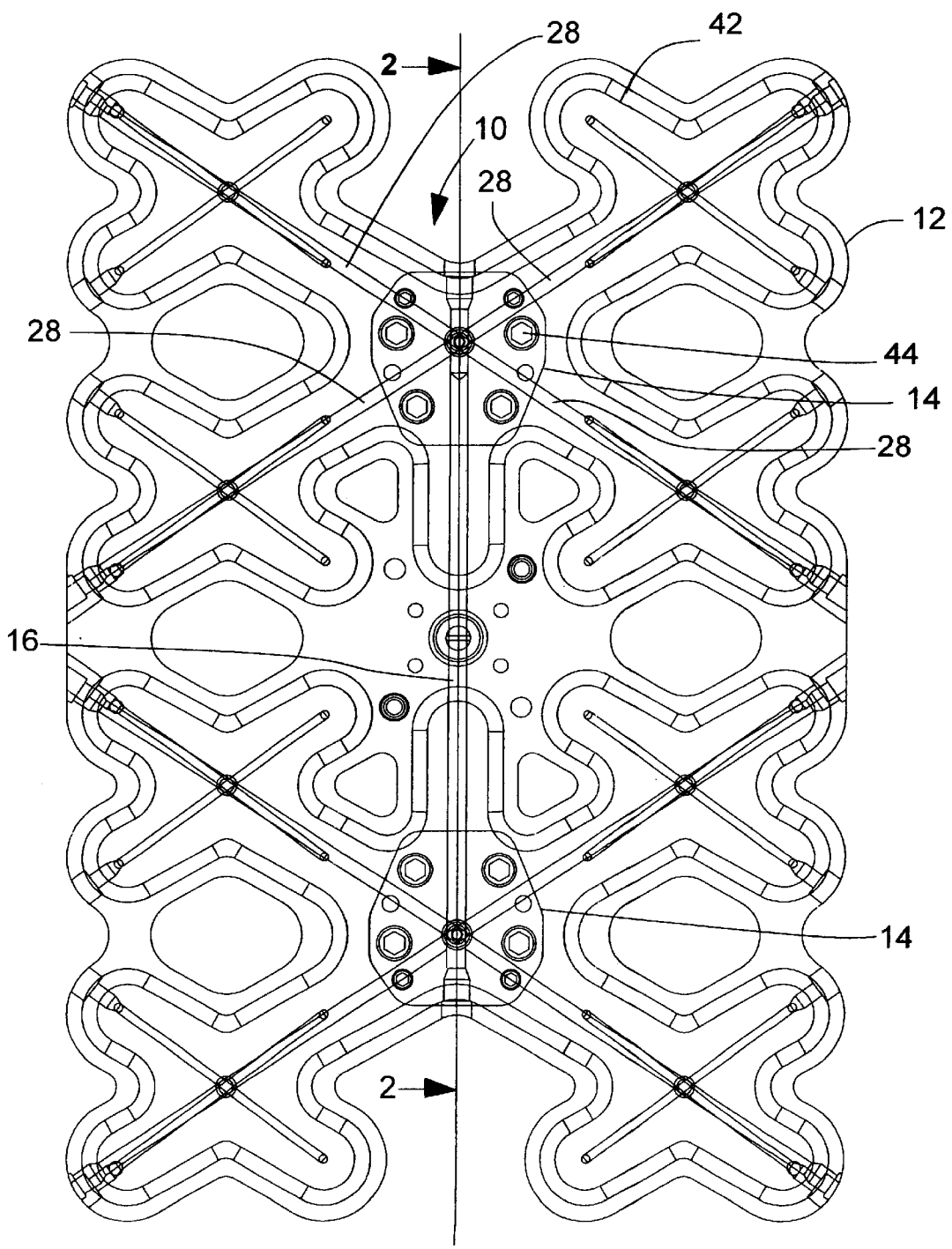
FIG. 1 is a top plan view of a hot runner manifold with two adapter plates installed thereon.

Referring first to FIG. 1, a preferred embodiment 10 of the present invention is generally shown. A hot runner manifold 12 preferably constructed of a large flat plate comprises a plurality of primary melt channels 16 running therein for communication of a hot and pressurized melt stream to a plurality of injection nozzles (not shown) for the formation of a molded article. A heater 42 in thermal communication with manifold 12 maintains the flowing melt at an elevated temperature.

Primary melt channels 16 branch out into a plurality of secondary melt channels 28. An adapter plate 14 is rigidly affixed, preferably (but not by limitation) by at least one fastener 44, to a face of the manifold 12, adjacent the point where the primary melt channel 16 branches out into secondary melt channels 28. It should be noted, that while the description of the present invention is directed at a specific location in the hot runner manifold, one of ordinary skill could easily place the invention at any point along the melt flow path. All such locations are fully contemplated by the present invention.

Figure 2:
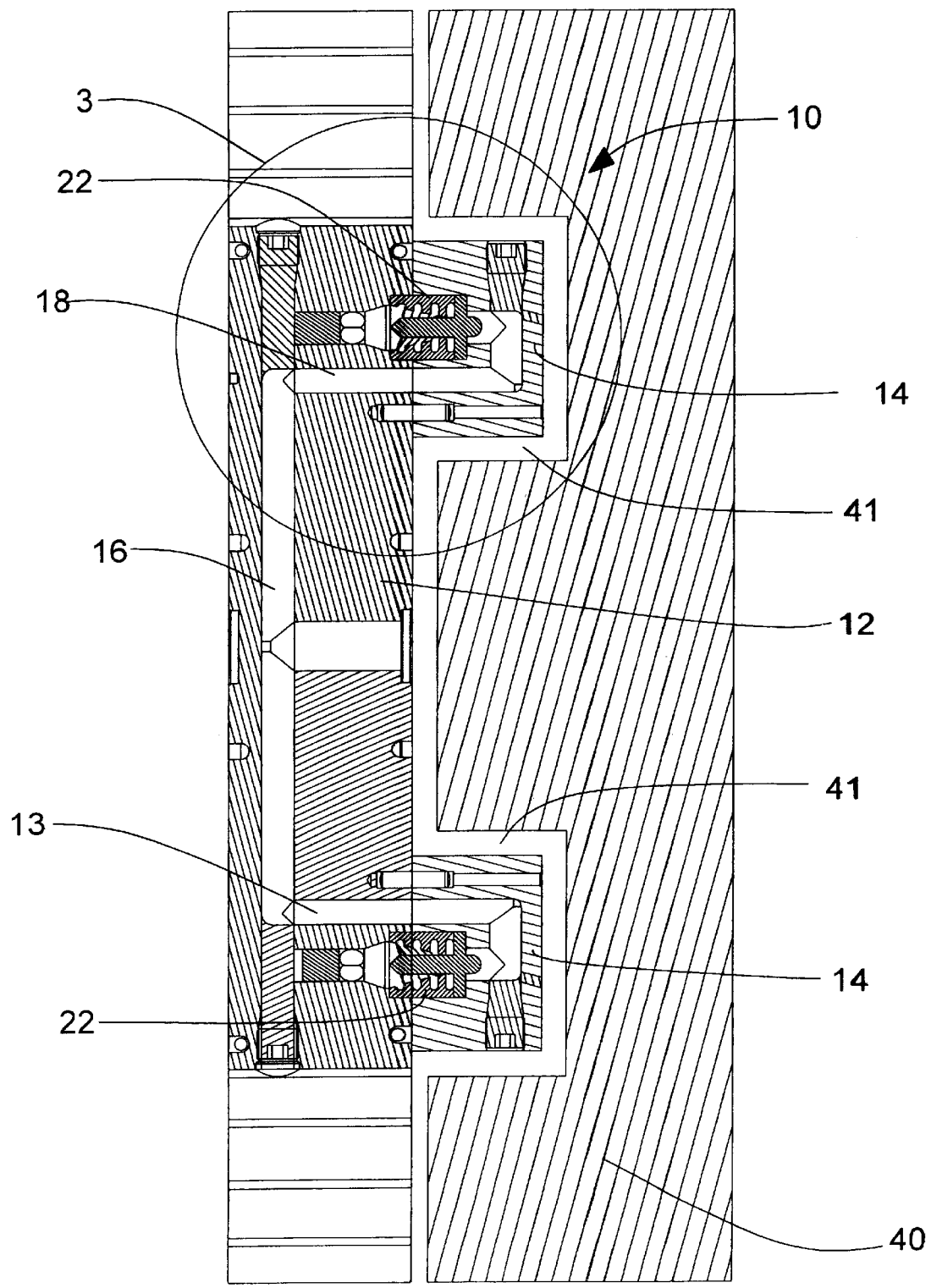
FIG. 2 is a side cross-sectional view of the hot runner manifold.
Figure 3:
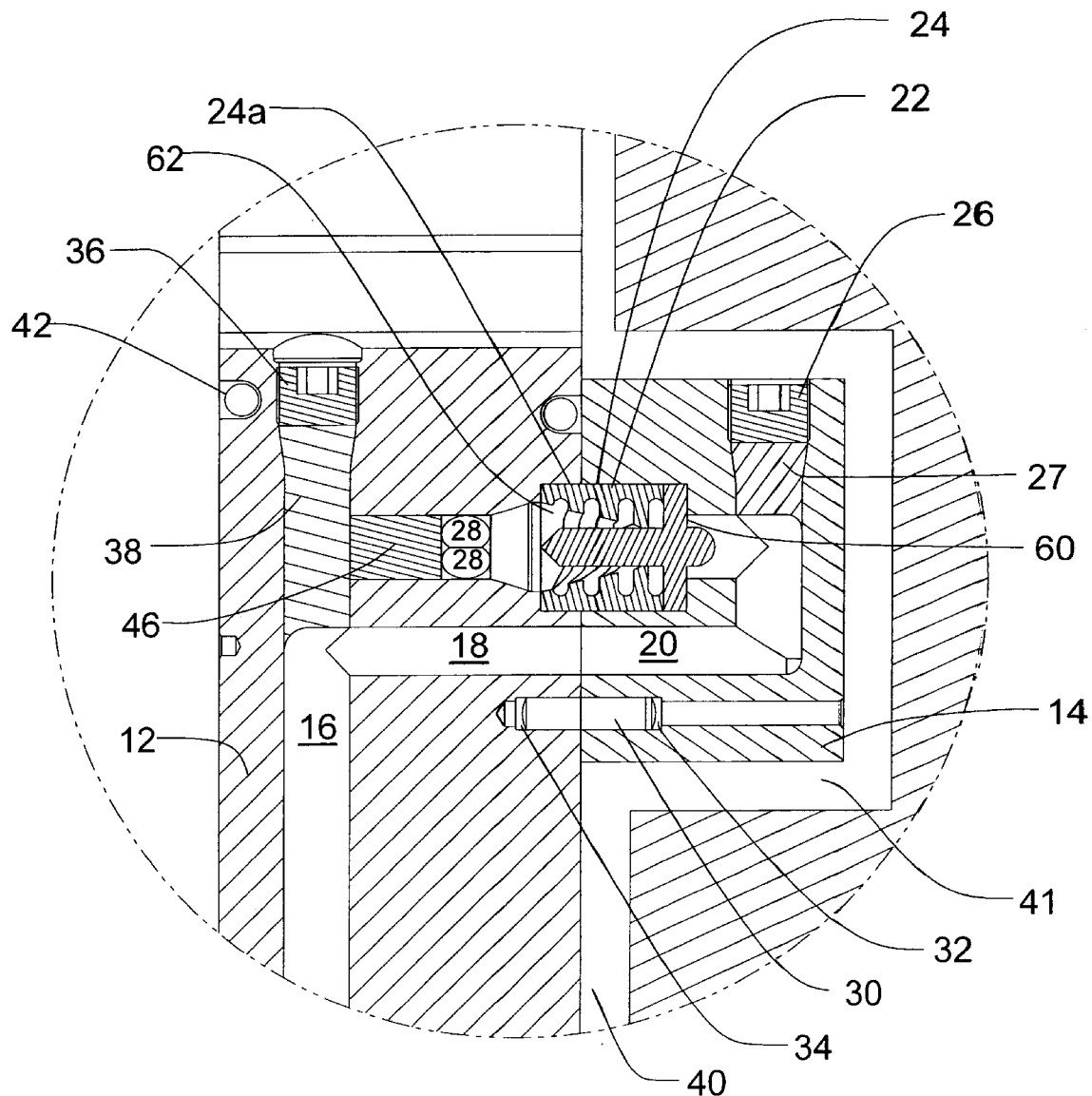
FIG. 3 is an enlarged cross-sectional view of the hot runner manifold and the adapter plate of a preferred embodiment of the present invention.

Referring now to FIG. 2 and FIG. 3, a cross-sectional side view of the preferred embodiment 10 of the present invention is shown. Adapter plate 14 comprises a third melt channel 20 which interfaces with first melt channel 18 which is located in manifold 12. Third melt channel 20 goes through a substantially 180° turn by completion of two 90° turns within adapter plate 14 such that the melt stream is communicated to a mixer 22. The mixer 22 is located in adapter plate 14 by means of a mixer bore 24 and a complementary mixer bore 24a located in manifold 12. In the preferred embodiment, a predetermined amount of axial sealing force is applied to the mixer 22 when the adapter plate 14 is secured to the manifold 12.

A pocket 41 is provided in the backing plate 40 which surrounds the adapter plate 14. This allows the backing plate 40 to be attached to manifold 12 in a similar fashion before the adapter plate 12 was installed.

For ease of manufacture, a plug 27 is inserted and rigidly affixed into adapter plate 14 by a threaded plug 26. Plug 27 is provided with a smooth front edge which forms part of the wall of third melt channel 20 to help alleviate hang-up or stagnation points that may occur in the flowing melt. A hole 34 in manifold 12 aligns with a hole 32 in adapter plate 14 when the adapter plate is installed on manifold 12. A locator 30 inserted into hole 32 and 34 ensures precise alignment of the various features of the adapter plate 14 to the manifold 12. In the preferred embodiment, the locator 30 is a dowel pin, spring pin or any other suitable locating device known in the art.

An elongated plug 38 is inserted in manifold 12 and rigidly affixed therein by threaded insert 36. Similar to plug 27, the end of plug 38 is smooth and forms part of the melt channel where primary melt channel 16 communicates with first melt channel 18. A fifth plug 46 is inserted perpendicular to plug 38, and fills the melt channel that was present before the hot runner manifold was modified for installation of the mixer and adapter plate. Plug 46 helps direct the melt flow to the plurality of secondary melt channels 28.

Mixer assembly 22 is trapped inside bores 24 and 24a between adapter plate 14 and manifold 12. The mixer assembly 22 is comprised of a flow inlet 60 and a flow exit 62. Flow inlet 60 communicates with third melt channel 20 for the transmission of the flowing melt through the mixer 22 to the flow exit 62. Flow exit 62 communicates with a plurality of secondary melt channels 28.

Figure 3A:
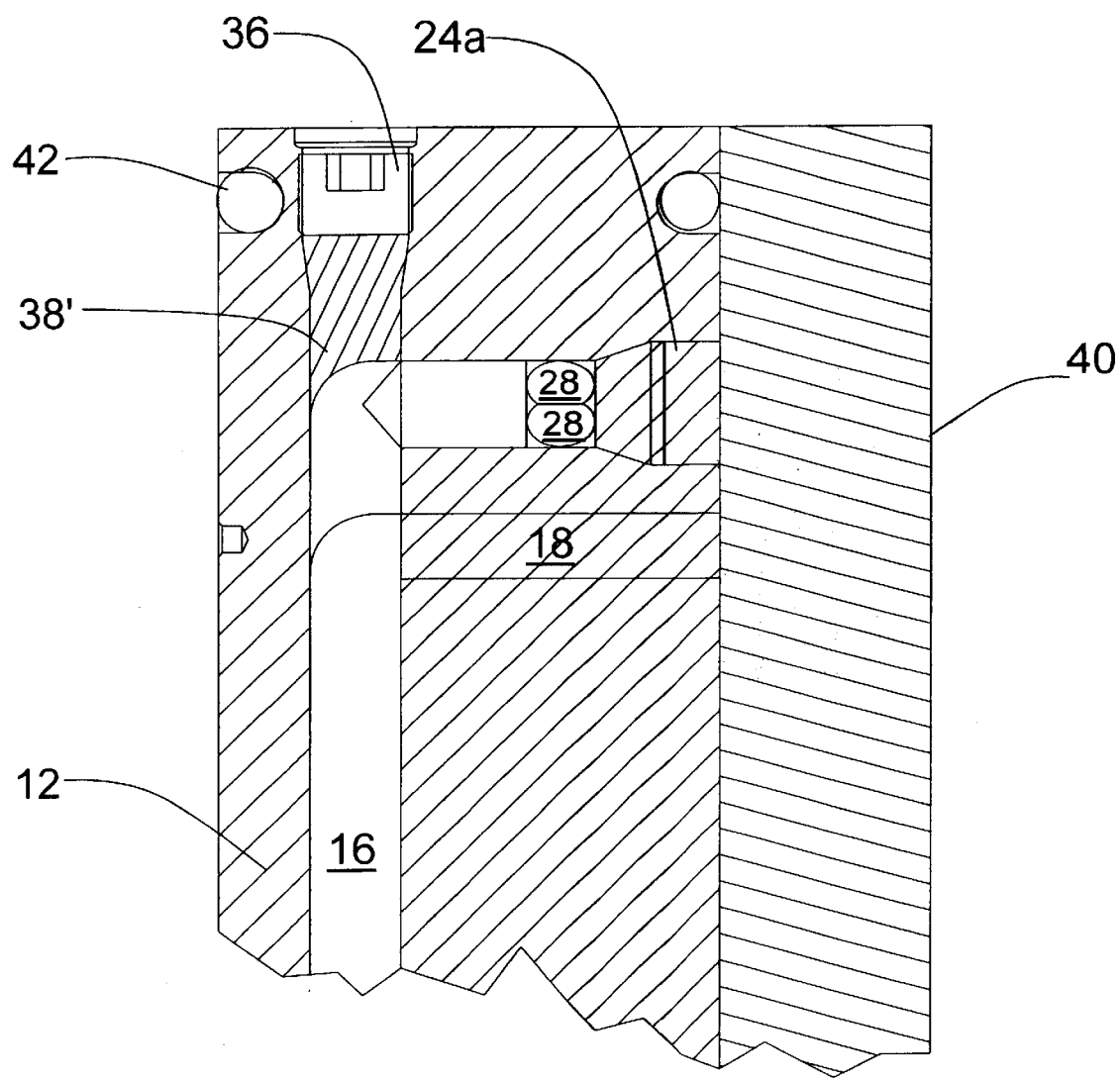
FIG. 3a is an enlarged cross-sectional view of a hot runner before modifications are made in accordance with a preferred embodiment of the present invention.

Referring now to FIG. 3a (where like features have like numerals), a typical hot runner manifold 12 is shown before modifications are performed for installation of the mixer assembly. By comparison of FIG. 3 to FIG. 3a, it can be seen that very little modifications to the hot runner manifold 12 are required to install the mixer assembly 22. Phantom lines are provided to show where first melt channel 18 would be located as well as where mixer bore 24a would be located. A shorter plug 38' is shown, which will need to be elongated as shown by plug 38 in FIG. 3. to effect the change in the direction of primary melt channel 16.

Figure 4:
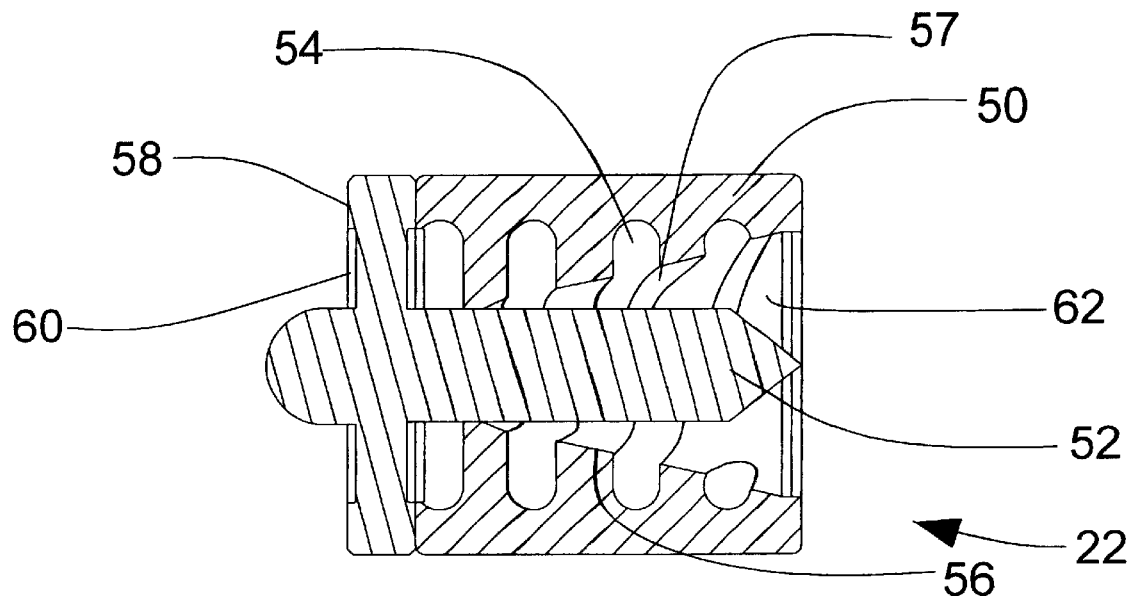
FIG. 4 is a side cross-sectional view of a representative mixer used in conjunction with a preferred embodiment of the present invention.
Figure 4A:
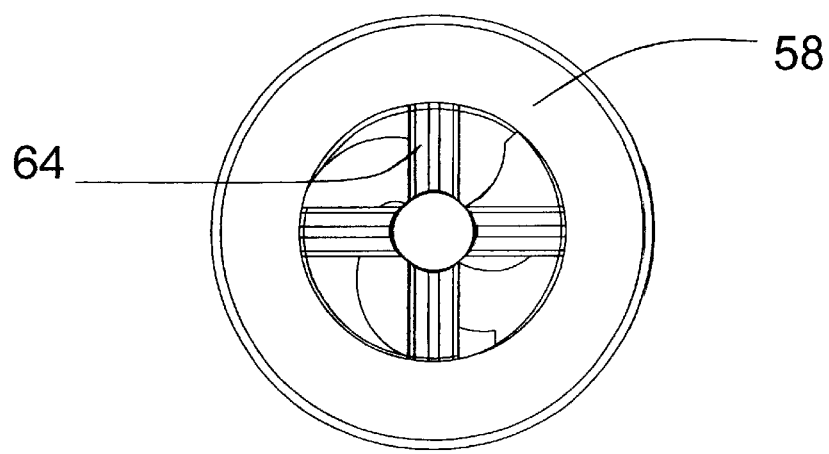
FIG. 4A is a top view of the mixer shown in FIG. 4.

Referring now to FIGS. 4 and 4A, in this preferred embodiment (and not by limitation), mixer assembly 22 is comprised of two pieces. A mixer bushing 50 with at least one spiral groove 54 formed therein running from the inlet 60 to the outlet 62 for communication of the fluid through the mixer assembly 22. An elongated torpedo 52 is inserted into the mixer bushing 50 and is maintained in a preferably coaxial position by at least one land 56 formed between the spiral groove 54. At the flow inlet 60, the torpedo 52 is comprised of an annular disk 58 which abuts against one end of the mixer bushing 50. A plurality of spokes 64 extend from the center of the torpedo 52 to annular disk 58, thereby creating space for the flowing melt as it enters the mixer assembly 22. As the spiral groove 54 and lands 56 travel along the direction of the melt flow, a gap 57 which increases in the direction of the melt flow, is formed between the elongated torpedo 52 and the mixer bushing 50. The cross-sectional area of the spiral groove 54 also decreases in the direction of the melt flow.

As the melt travels through mixer 22, more and more of the melt gradually spills out of the spiral groove 54 and over lands 56 such that the melt flow transitions from all helical to all annular flow. This mixing action has been shown to substantially eliminate flow imbalances that occur inside a melt stream.

It should be noted that while the foregoing description provided only a single description for a mixer, one skilled in the art could easily envision alternative mixer arrangements, and as such, all such mixer embodiments are fully contemplated within the scope of the present invention.

It is to be understood that the invention is not limited to the illustrations described herein, which are deemed to illustrate the best modes of carrying out the invention, and which are susceptible to modification of form, size, arrangement of parts and details of operation. The invention is intended to encompass all such modifications, which are within its spirit and scope as defined by the claims.

What is claimed is:

1. A hot runner subsystem for an injection molding machine, the hot runner subsystem comprising:
    a heated manifold having at least one primary melt channel disposed therein;
    an adapter plate rigidly affixed to said manifold, said adapter plate having at least one first melt channel communicating with said at least one primary melt channel; and
    a mixer having an inlet and an exit, said inlet communicating with said first melt channel, and said exit communicating with a secondary melt channel.

2. The hot runner subsystem of claim 1, wherein said adapter plate is aligned with said manifold by at least one locator.

3. The hot runner subsystem of claim 2, wherein said at least one locator is one selected from the group consisting of a dowel pin, spring pin, clevis pin, spiral pin and threaded fastener.

4. The hot runner subsystem of claim 2, wherein said at least one locator is a raised area on said manifold that interfaces with said adapter plate.

5. The hot runner subsystem of claim 2, wherein said at least one locator is a raised area on said adapter plate that interfaces with said manifold.

6. The hot runner subsystem of claim 1, wherein said adapter plate is rigidly affixed to said manifold by at least one fastener.

7. The hot runner subsystem of claim 6, wherein said at least one fastener is one selected from the group consisting of a threaded fastener, rivet, pin, spike, stake, snap ring and e-ring.

8. The hot runner subsystem of claim 1, wherein said adapter plate is rigidly affixed to said manifold by one selected from the group consisting of welding, brazing and bonding.

9. The hot runner subsystem of claim 1, wherein said at least one first melt channel changes direction by substantially 180°.

10. The hot runner subsystem of claim 1, wherein said adapter plate further comprises at least one plug having a smooth surface in fluid communication with said at least one first melt channel.

11. The hot runner subsystem of claim 10, wherein said plug is rigidly affixed in said adapter plate by an additional threaded plug.

12. The hot runner subsystem of claim 10, wherein said plug is welded into said adapter plate.

13. The hot runner subsystem of claim 10, wherein said plug further comprises a tapered section.

14. The hot runner subsystem of claim 13, wherein said plug is rigidly affixed in said adapter plate by an additional threaded plug.

15. The hot runner subsystem of claim 13, wherein said plug is welded into said adapter plate.

16. The hot runner subsystem of claim 1, wherein said mixer is retained between said adapter plate and said manifold.

17. The hot runner subsystem of claim 1, wherein said secondary melt channel is in said manifold.

18. The hot runner subsystem of claim 1, wherein said secondary melt channel is in said adapter plate.

19. The hot runner subsystem of claim 1, wherein said mixer is retained in a bore located in said adapter plate.

20. The hot runner subsystem of claim 1, wherein said mixer is retained in a bore located in said manifold.

21. The hot runner subsystem of claim 1, wherein said mixer is retained in a bore of said manifold and a bore in said adapter plate.

22. The hot runner subsystem of claim 1, wherein said adapter plate is held in alignment with said manifold by said mixer.

23. The hot runner subsystem of claim 1, wherein said manifold further comprises an elongated plug for altering the path of said primary melt channel for communication of said fluid to said adapter plate.

24. The hot runner subsystem of claim 23, wherein said elongated plug is rigidly affixed to said manifold by a threaded plug.

25. The hot runner subsystem of claim 23, wherein said elongated plug is rigidly affixed to said manifold by one selected from the group consisting of welding, brazing and bonding.

26. The hot runner subsystem of claim 23, wherein said elongated plug is further comprised of a smooth surface on a face of said plug, said face being in fluid communication with said primary melt channel.

27. The hot runner subsystem of claim 1, wherein said mixer further comprises:
  a mixer bushing having at least one spiral groove formed in an inner surface of said bushing for the communication of said fluid from said inlet to said exit,
  a series of lands formed between said at least one spiral groove,
  a torpedo having an elongated portion inserted in said bushing such that said fluid is forced to flow in said spiral groove for a predetermined distance.

28. The hot runner subsystem of claim 27, wherein a gradually increasing gap is formed between said lands and said torpedo in the direction of flow of said fluid.

29. The hot runner subsystem of claim 27, wherein said spiral groove decreases in cross-sectional area as it travels from said inlet to said exit.

30. The hot runner subsystem of claim 27, wherein said torpedo has an annular disk portion which abuts said mixer bushing.

31. The hot runner subsystem of claim 30, wherein said annular disk portion is affixed to said elongated portion of said torpedo by a plurality of spokes.

32. The hot runner subsystem of claim 30, wherein said annular disk portion is substantially co-axial to said mixer bushing.

33. The hot runner subsystem of claim 1, further comprising a backing plate removably affixed to said manifold, said backing plate having a pocket formed therein to fit around said adapter plate.

34. A hot runner system for distributing molten material in an injection molding machine comprising:
  a manifold having at least one primary melt channel and a plurality of secondary melt channels branching from the primary melt channel;
  an adapter plate attached to the manifold, the adapter plate having a first melt channel in fluid communication with the primary melt channel and at least one of the secondary melt channels;
  a mixer in the first melt channel; and
  a plug in the primary melt channel which, in use, directs the molten material flowing through the primary melt channel through the first melt channel and the mixer before it enters the secondary melt channels.

35. The hot runner system claim 34, wherein the plurality of secondary melt channels branch from the primary melt channel at a juncture, and wherein the adapter plate is attached to the manifold adjacent the juncture.

* * * * *